US010173538B2

(12) United States Patent
Iwawaki et al.

(10) Patent No.: US 10,173,538 B2
(45) Date of Patent: Jan. 8, 2019

(54) WIRELESS CHARGING SYSTEM AND WIRELESS CHARGING TRANSMISSION APPARATUS AND METHOD CHANGING FREQUENCY TO TRANSMIT POWER

(75) Inventors: Keisuke Iwawaki, Otaward (JP); Shinichi Ogura, Turagashima (JP)

(73) Assignee: PIONEER CORPORATION, Kanagawa (JP)

( * ) Notice: Subject to any disclaimer, the term of this patent is extended or adjusted under 35 U.S.C. 154(b) by 477 days.

(21) Appl. No.: 14/385,343

(22) PCT Filed: Mar. 14, 2012

(86) PCT No.: PCT/JP2012/056547
§ 371 (c)(1),
(2), (4) Date: Oct. 29, 2014

(87) PCT Pub. No.: WO2013/136464
PCT Pub. Date: Sep. 19, 2013

(65) Prior Publication Data
US 2015/0091510 A1 Apr. 2, 2015

(51) Int. Cl.
*B60L 11/18* (2006.01)
*H02J 7/02* (2016.01)
(Continued)

(52) U.S. Cl.
CPC ......... *B60L 11/182* (2013.01); *B60L 11/1825* (2013.01); *B60L 11/1829* (2013.01);
(Continued)

(58) Field of Classification Search
CPC .......... B60L 11/182; B60L 11/1829; B60L 11/1833; B60L 11/1838; B60L 11/1825;
(Continued)

(56) References Cited

U.S. PATENT DOCUMENTS 7,208,912 B2 * 4/2007 Ghabra .................. H02J 7/025
320/108
8,129,864 B2 * 3/2012 Baarman ................. H02J 5/005
307/104
(Continued)

FOREIGN PATENT DOCUMENTS

JP 10-304582 11/1998
JP 2011-061893 3/2011
(Continued)

OTHER PUBLICATIONS

International Search Report, PCT/JP2012/056547, dated Jun. 5, 2012.
(Continued)

*Primary Examiner* — Richard Isla
*Assistant Examiner* — Manuel Hernandez
(74) *Attorney, Agent, or Firm* — Young & Thompson

(57) ABSTRACT

A wireless charging control apparatus is mounted on a power transmission side apparatus which is provided with: a power transmission unit (102); and a power transmission circuit (113, 114, 115) electrically connected to the power transmission unit and electrically connected to a high-frequency alternating current (AC) power supply (103). The wireless charging control apparatus is provided with: an obtaining device (111) configured to obtain a demand signal indicating a power transmission demand; a controlling device (111) configured to control the power transmission circuit such that electric power is transmitted at a first output voltage from the power transmission unit to a power reception unit (202) of a power reception side apparatus in such a condition that the demand signal is obtained; and a receiving device (112) configured to receive a restoration signal indicating that the power reception side apparatus in a standby state is restored to a start state.

6 Claims, 4 Drawing Sheets

(51) Int. Cl.
*H04B 5/00* (2006.01)
*H02J 7/00* (2006.01)
*H02J 50/12* (2016.01)
*H02J 50/80* (2016.01)

(52) U.S. Cl.
CPC ....... *B60L 11/1833* (2013.01); *B60L 11/1838* (2013.01); *H02J 7/0052* (2013.01); *H02J 7/025* (2013.01); *H02J 50/12* (2016.02); *H02J 50/80* (2016.02); *H04B 5/0037* (2013.01); *B60L 2230/16* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC .......... H02J 7/0052; H02J 5/005; H02J 7/025; H04B 5/0037
USPC ......................................................... 320/108
See application file for complete search history.

(56) References Cited

U.S. PATENT DOCUMENTS

| | | | |
|---|---|---|---|
| 9,385,558 B2 | 7/2016 | Kawasaki | |
| 9,692,238 B2* | 6/2017 | Matsumoto | H02J 7/025 |
| 2009/0174263 A1* | 7/2009 | Baarman | H02J 5/005 |
| | | | 307/104 |
| 2009/0174264 A1* | 7/2009 | Onishi | H02J 5/005 |
| | | | 307/104 |
| 2010/0133917 A1* | 6/2010 | Sekino | H02J 7/025 |
| | | | 307/104 |
| 2010/0176659 A1* | 7/2010 | Aoyama | H02J 7/025 |
| | | | 307/104 |
| 2010/0187913 A1* | 7/2010 | Smith | H02J 5/005 |
| | | | 307/104 |
| 2010/0225173 A1* | 9/2010 | Aoyama | H02J 5/005 |
| | | | 307/104 |
| 2010/0244578 A1* | 9/2010 | Yoshikawa | H02J 5/005 |
| | | | 307/104 |
| 2010/0244582 A1* | 9/2010 | Yoshikawa | H02J 7/025 |
| | | | 307/104 |
| 2011/0080051 A1* | 4/2011 | Lee | H02J 5/005 |
| | | | 307/104 |
| 2011/0081857 A1* | 4/2011 | Lee | G06K 7/0008 |
| | | | 455/41.1 |
| 2011/0193417 A1* | 8/2011 | Hirasaka | H02J 5/005 |
| | | | 307/104 |
| 2012/0038218 A1* | 2/2012 | Ichikawa | H02J 5/005 |
| | | | 307/97 |
| 2012/0049640 A1* | 3/2012 | Ichikawa | H02J 5/005 |
| | | | 307/99 |
| 2012/0062172 A1* | 3/2012 | Takada | B60L 11/182 |
| | | | 320/108 |
| 2012/0153739 A1* | 6/2012 | Cooper | H02J 5/005 |
| | | | 307/104 |
| 2012/0187771 A1* | 7/2012 | Kamata | H02J 7/025 |
| | | | 307/104 |
| 2012/0212072 A1* | 8/2012 | Miyabayashi | H04B 5/0037 |
| | | | 307/104 |
| 2012/0235508 A1* | 9/2012 | Ichikawa | H02J 5/005 |
| | | | 307/104 |
| 2012/0286726 A1* | 11/2012 | Kim | B60L 11/182 |
| | | | 320/108 |
| 2012/0326524 A1* | 12/2012 | Matsumoto | H01M 10/425 |
| | | | 307/104 |
| 2013/0026848 A1* | 1/2013 | Ito | B60L 11/182 |
| | | | 307/104 |
| 2013/0099732 A1* | 4/2013 | Lee | H02J 50/12 |
| | | | 320/108 |
| 2014/0111022 A1* | 4/2014 | Yamakawa | H04B 5/0037 |
| | | | 307/104 |
| 2014/0253052 A1* | 9/2014 | Goma | H02J 5/005 |
| | | | 320/166 |
| 2016/0280079 A1 | 9/2016 | Kawasaki | |
| 2016/0329751 A1* | 11/2016 | Mach | H02J 5/005 |
| 2017/0182895 A1* | 6/2017 | Fischperer | H02J 7/025 |
| 2018/0159371 A1* | 6/2018 | Kim | H02J 50/12 |

FOREIGN PATENT DOCUMENTS

| | | |
|---|---|---|
| WO | 2010/041312 | 4/2010 |
| WO | WO 2012/042902 | 4/2012 |

OTHER PUBLICATIONS

Notice of Reasons for Refusal dated Dec. 15, 2015 in Japanese Patent Application No. 2014-504553 with English translation of Notice of Reasons for Refusal.

* cited by examiner

WIRELESS CHARGING SYSTEM AND WIRELESS CHARGING TRANSMISSION APPARATUS AND METHOD CHANGING FREQUENCY TO TRANSMIT POWER

TECHNICAL FIELD

The present invention relates to a wireless charging control apparatus, a wireless charging control method and a computer program which are configured to control charging in such a system that electric power is transmitted and received in a wireless manner between a power transmission unit and a power reception unit and that charges an electrical load such as, for example, a battery electrically connected to a power reception side apparatus.

BACKGROUND ART

As a charging apparatus on which this type of apparatus is mounted, there is proposed, for example, an inductive charging apparatus in which a communication circuit referred to as a RF substrate is always powered on, in order to realize a function of recovering from power failure by inserting a power transmission side paddle into a power reception side port and turning on a mechanical limit switch. Here, in particular, it is described that the RF substrate on the power reception side communicates with a power transmission side apparatus, and that the communication results in a start signal of a power reception side battery ECU (refer to Patent document 1).

PRIOR ART DOCUMENTS

Patent Document

Patent document 1: Japanese Patent Application Laid Open No. H10-304582

SUMMARY OF INVENTION

Subject to be Solved by the Invention

According to the technology described in the Patent document 1, the power transmission side paddle needs to be inserted into the power reception side port, and the mechanical limit switch in the port needs to be pressed by the paddle. There is thus such a technical problem that the technology described in the Patent document 1 is hardly applied to a charging apparatus in which a power transmission unit and a power reception unit are not in contact.

In view of the aforementioned problems, it is therefore an object of the present invention to provide a wireless charging control apparatus, a wireless charging control method and a computer program which can restore the system without a mechanical contact between the power transmission unit and the power reception unit.

Means for Solving the Subject

The above object of the present invention can be solved by a first wireless charging control apparatus mounted on a power transmission side apparatus, the power transmission side apparatus is provided with: a power transmission unit disposed at a distance from and opposed to a power reception unit of a power reception side apparatus; and a power transmission circuit electrically connected to the power transmission unit and electrically connected to a high-frequency alternating current (AC) power supply, said wireless charging control apparatus is provided with: an obtaining device configured to obtain a demand signal indicating a power transmission demand; a controlling device configured to control the power transmission circuit such that electric power is transmitted at a first output voltage from the power transmission unit to the power reception unit in such a condition that the demand signal indicating the power transmission demand is obtained; and a receiving device configured to receive a restoration signal indicating that the power reception side apparatus in a standby state is restored to a start state due to the transmitted electric power.

According to the first wireless charging control apparatus of the present invention, the first wireless charging control apparatus is mounted on the power transmission side apparatus which is provided with: the power transmission unit disposed at a distance from and opposed to the power reception unit of the power reception side apparatus; and the power transmission circuit electrically connected to the power transmission unit and electrically connected to the high-frequency AC power supply. Between the power transmission unit and the power reception unit, electric power is transmitted and received without a mechanical contact by magnetic field coupling such as, for example, electromagnetic induction and magnetic resonance.

The obtaining device obtains the demand signal indicating the power transmission demand. The demand signal indicating the power transmission demand may be transmitted, for example, by a user operating an input apparatus such as a button attached to the power transmission side apparatus, or from the power reception unit.

The controlling device which is provided, for example, with a memory, a processor and the like, controls the power transmission circuit such that the electric power is transmitted at the first output voltage from the power transmission unit to the power reception unit in such a condition that the demand signal indicating the power transmission demand is obtained. The "first output voltage" is typically set to a value which does not allow an excessive load to be applied to electrical components which constitute the power reception side apparatus.

The receiving device is configured to receive the restoration signal indicating that the power reception side apparatus in the standby state is restored to the start state due to the transmitted electric power. In the "standby state", typically, electrical connection is cut off between a power receiving circuit of the power reception side apparatus and an electrical load such as, for example, a battery. On the other hand, in the "start state", the power receiving circuit of the power reception side apparatus and the electrical load such as, for example, a battery are electrically connected.

According to the study of the present inventors, the following matter has been found. In the power reception side apparatus, in many cases, the electrical connection is cut off between the power receiving circuit of the power reception side apparatus and the electrical load such as, for example, a battery after the end of the charging of the electrical load such as, for example, a battery. In this case, the power receiving circuit has almost no load. If, for example, electric power which is equivalent to that upon the charging is transmitted from the power transmission side apparatus to the power reception side apparatus in a situation in which the electrical connection is cut off between the power receiving circuit and the electrical load, an excessive load is likely applied to the power reception side apparatus, because the power receiving circuit has almost no load.

In the present invention, however, the power transmission circuit is controlled by the controlling device such that the electric power is transmitted at the first output voltage from the power transmission unit to the power reception unit in such a condition that the demand signal indicating the power transmission demand is obtained. If the first output voltage is set not to exceed a rated value of a circuit element(s) which constitutes the power receiving circuit even though the power receiving circuit has no load, then, it is possible to transmit the electric power without applying an excessive load to the power reception side apparatus. Moreover, if the power reception side apparatus is configured to be restored from the standby state to the start state in such a condition that the electric power transmitted from the power transmission side apparatus is received, then, the power reception side apparatus can be appropriately restored.

As described above, according to the first wireless charging control apparatus of the present invention, the system can be restored without requiring the mechanical contact between the power transmission unit and the power reception unit.

In one aspect of the first wireless charging control apparatus of the present invention, wherein said controlling device controls the power transmission circuit such that the electric power is transmitted at the first output voltage, with frequency changed, from the power transmission unit to the power reception unit in such a condition that the demand signal indicating the power transmission demand is obtained.

According to this aspect, even if a positional relation between the power transmission unit and the power reception unit changes from a design value, the power reception side apparatus can be appropriately restored. Here, according to the study of the present inventor(s), the following has been found; namely, if the positional relation changes between the power transmission unit and the power reception unit, resonance frequency optimal to the power transmission also changes, and AC power with the frequency shifted from the optimal resonance frequency does not allow sufficient electric power to be supplied to the power reception side apparatus In another aspect of the first wireless charging control apparatus of the present invention, wherein said controlling device controls the power transmission circuit such that the electric power is transmitted at a second output voltage which is greater than the first output voltage, from the power transmission unit to the power reception unit in such a condition that the restoration signal is received by the power receiving device.

According to this aspect, it is possible to appropriately charge the electric load such as, for example, a battery electrically connected to the power receiving circuit. The "second output voltage" is an output voltage when the electrical load such as a battery is charged. The second output voltage may be set in view of specification of each of the power transmission side apparatus and the power reception side apparatus.

The above object of the present invention can be solved by a second wireless charging control apparatus mounted on a power reception side apparatus, the power reception side apparatus is provided with: a power reception unit disposed at a distance from and opposed to a power transmission unit of a power transmission side apparatus; a power receiving circuit electrically connected to the power reception unit; and a controlling device configured to control the power receiving circuit, said wireless charging control apparatus is provided with: a restoring device configured to restore the controlling device in a standby state to a start state in such a condition that receiving voltage of electric power received via the power reception unit is greater than a threshold value; and a transmitting device configured to transmit a signal indicating that the controlling device is restored to the start state, to the power reception side apparatus, after the controlling device is restored to the start state.

According to the second wireless charging control apparatus of the present invention, the second wireless charging control apparatus is mounted on the power reception side apparatus which is provided with: the power reception unit disposed at a distance from and opposed to the power transmission unit of the power transmission side apparatus; the power receiving circuit electrically connected to the power reception unit; and the controlling device configured to control the power receiving circuit.

Between the power transmission unit and the power reception unit, electric power is transmitted and received without a mechanical contact by the magnetic field coupling such as, for example, electromagnetic induction and magnetic resonance. The expression "to control the power receiving circuit" means to control the circuit element(s) such as, for example, a switching element which constitutes the power receiving circuit.

The restoring device which is provided, for example, with a memory, a processor and the like, restores the controlling device in the standby state to the start state in such a condition that the receiving voltage of the electric power received via the power reception unit is greater than the threshold value. The "threshold value" is a value for determining whether or not to restore the controlling device from the standby state to the start state, and is set as a fixed value in advance, or as a variable value according to some physical quantity or parameter.

The "threshold value" as described above may be set by obtaining a relation between the output voltage of the power transmission side apparatus and the receiving voltage when the power reception side apparatus receives the power supply from the power transmission side apparatus by experiments or simulations. Then, on the basis of the obtained relation, the "threshold value" may be set as the receiving voltage corresponding to the output voltage of the power transmission side apparatus when the controlling device is in the standby state, or as a value which is greater than the receiving voltage by a predetermined value.

The transmitting device transmits the signal indicating that the controlling device is restored to the start state, to the power reception side apparatus, after the controlling device is restored to the start state.

As described above, according to the second wireless charging control apparatus of the present invention, the controlling device can be restored without requiring the mechanical contact between the power transmission unit and the power reception unit. Moreover, since the power transmission side apparatus is notified by the transmitting device that the controlling device is restored to the start state, it is possible to start to charge the electrical load such as, for example, a battery electrically connected to the power receiving circuit, quickly after the restoration of the controlling device.

In one aspect of the second wireless charging control apparatus of the present invention, wherein the power receiving circuit includes a rectifier, and said restoring device includes a voltage detecting device configured to detect voltage of a part after the rectifier, as the receiving voltage.

According to this aspect, the receiving voltage can be detected, relatively easily. The "voltage of the part after the rectifier" means voltage of direct current (DC) power converted by the rectifier.

The above object of the present invention can be solved by a first wireless charging control method in a power transmission side apparatus, the power transmission side apparatus is provided with: a power transmission unit disposed at a distance from and opposed to a power reception unit of a power reception side apparatus; and a power transmission circuit electrically connected to the power transmission unit and electrically connected to a high-frequency alternating current (AC) power supply, said wireless charging control method is provided with: an obtaining process of obtaining a demand signal indicating a power transmission demand; a controlling device process of controlling the power transmission circuit such that electric power is transmitted at a first output voltage from the power transmission unit to the power reception unit in such a condition that the demand signal indicating the power transmission demand is obtained; and a receiving process of receiving a restoration signal indicating that the power reception side apparatus in a standby state is restored to a start state due to the transmitted electric power.

According to the first wireless charging control method of the present invention, the system can be restored without requiring the mechanical contact between the power transmission unit and the power reception unit, as in the first wireless charging control apparatus of the present invention described above.

The first wireless charging control method of the present invention can also adopt the same various aspects as those of the first wireless charging control apparatus of the present invention described above.

The above object of the present invention can be solved by a second wireless charging control method in a power reception side apparatus, the power reception side apparatus is provided with: a power reception unit disposed at a distance from and opposed to a power transmission unit of a power transmission side apparatus; a power receiving circuit electrically connected to the power reception unit; and a controlling device configured to control the power receiving circuit, said wireless charging control method is provided with: a restoring process of restoring the controlling device in a standby state to a start state in such a condition that receiving voltage of electric power received via the power reception unit is greater than a threshold value; and a transmitting process of transmitting a signal indicating that the controlling device is restored to the start state, to the power reception side apparatus, after the controlling device is restored to the start state.

According to the second wireless charging control method of the present invention, the controlling device can be restored without requiring the mechanical contact between the power transmission unit and the power reception unit, as in the second wireless charging control apparatus of the present invention described above.

The second wireless charging control method of the present invention can also adopt the same various aspects as those of the second wireless charging control apparatus of the present invention described above.

The above object of the present invention can be solved by a first computer program for making a computer function as an obtaining device, a controlling device, and a receiving device, the computer being mounted on a power transmission side apparatus, the power transmission side apparatus is provided with: a power transmission unit disposed at a distance from and opposed to a power reception unit of a power reception side apparatus; and a power transmission circuit electrically connected to the power transmission unit and electrically connected to a high-frequency alternating current (AC) power supply, said wireless charging control apparatus is provided with: the obtaining device configured to obtain a demand signal indicating a power transmission demand; the controlling device configured to control the power transmission circuit such that electric power is transmitted at a first output voltage from the power transmission unit to the power reception unit in such a condition that the demand signal indicating the power transmission demand is obtained; and the receiving device configured to receive a restoration signal indicating that the power reception side apparatus in a standby state is restored to a start state due to the transmitted electric power.

According to the first computer program of the present invention, the first wireless charging control apparatus of the present invention described above can be relatively easily realized as the computer provided in the power transmission side apparatus reads and executes the computer program from a recording medium for storing the computer program, such as a compact disc read only memory (CD-ROM) and a DVD read only memory (DVD-ROM), or as it executes the computer program after downloading the program through a communication device. By this, the system can be restored without requiring the mechanical contact between the power transmission unit and the power reception unit, as in the first wireless charging control apparatus of the present invention described above.

The above object of the present invention can be solved by a second computer program for making a computer function as a restoring device and a transmitting device, the computer being mounted on a power reception side apparatus, the power reception side apparatus is provided with: a power reception unit disposed at a distance from and opposed to a power transmission unit of a power transmission side apparatus; a power receiving circuit electrically connected to the power reception unit; and a controlling device configured to control the power receiving circuit, said wireless charging control apparatus is provided with: the restoring device configured to restore the controlling device in a standby state to a start state in such a condition that receiving voltage of electric power received via the power reception unit is greater than a threshold value; and the transmitting device configured to transmit a signal indicating that the controlling device is restored to the start state, to the power reception side apparatus, after the controlling device is restored to the start state.

According to the second computer program of the present invention, the second wireless charging control apparatus of the present invention described above can be relatively easily realized as the computer provided in the power reception side apparatus reads and executes the computer program from a recording medium for storing the computer program, such as a compact disc read only memory (CD-ROM) and a DVD read only memory (DVD-ROM), or as it executes the computer program after downloading the program through a communication device. By this, the controlling device can be restored without requiring the mechanical contact between the power transmission unit and the power reception unit, as in the second wireless charging control apparatus of the present invention described above.

The operation and other advantages of the present invention will become more apparent from embodiments explained below.

MODES FOR CARRYING OUT THE INVENTION

Hereinafter, embodiments of the wireless charging control apparatus of the present invention will be explained with reference to the drawings.

<First Embodiment>

A first embodiment of the wireless charging control apparatus of the present invention will be explained with reference to FIG. 1 to FIG. 4.

Figure 1:
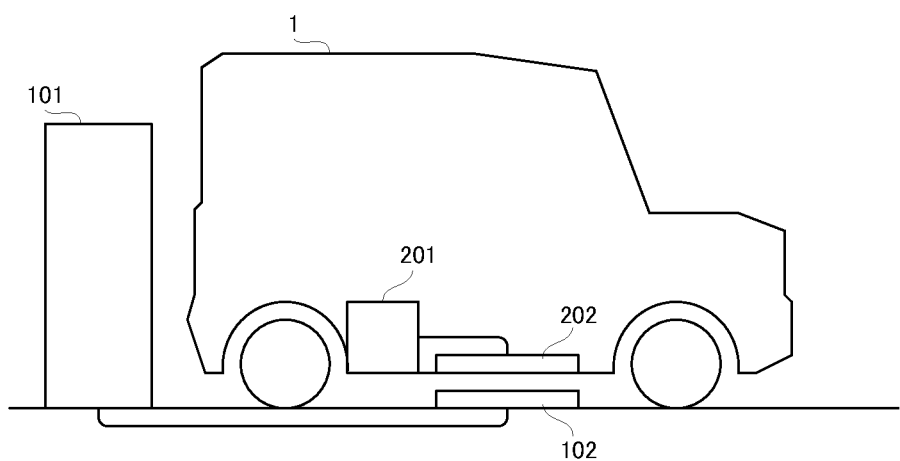
FIG. 1 is a schematic diagram illustrating a schematic configuration of a charging system in a first embodiment.

Firstly, an entire configuration of a charging system in the embodiment will be explained with reference to FIG. 1. FIG. 1 is a schematic diagram illustrating the schematic configuration of the charging system in the first embodiment.

In FIG. 1, a power transmission side apparatus is provided with a charger body 101 disposed, for example, in a parking space or the like, and a primary coil 102 which is electrically connected to the charger body 101 and which is at least partially buried in the ground. On the other hand, a power reception side apparatus mounted on a vehicle 1 such as, for example, an electric vehicle and a plug-in hybrid vehicle is provided with a secondary coil 202 which is electrically connected to a battery 201 for driving the vehicle 1.

Between the primary coil 102 and the second coil 202, electric power is transmitted and received without a mechanical contact (i.e. in a wireless manner) by magnetic field coupling such as, for example, electromagnetic induction and magnetic resonance.

Figure 2:
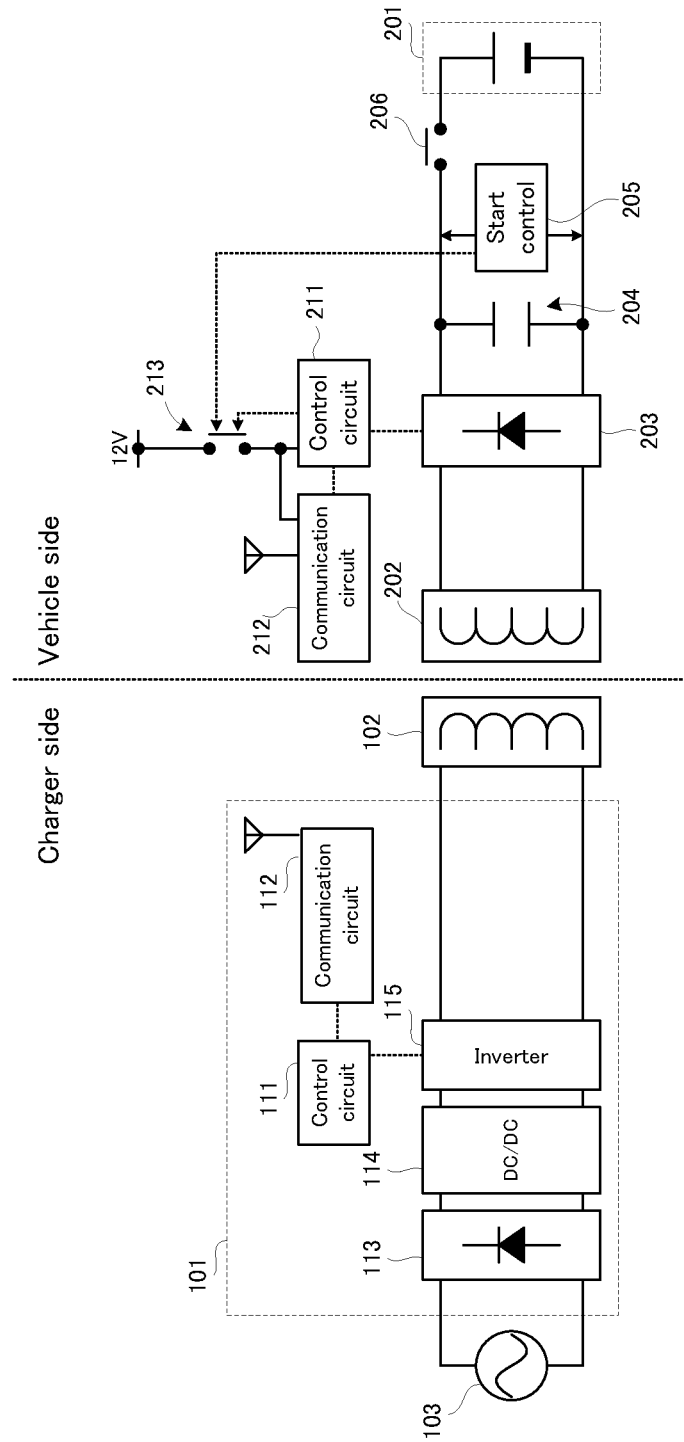
FIG. 2 is a block diagram illustrating a configuration of a power transmission side apparatus and a configuration of a power reception side apparatus in the first embodiment.

Next, the detailed configuration of each of the power transmission side apparatus and the power reception side apparatus will be explained with reference to FIG. 2. FIG. 2 is a block diagram illustrating the configuration of the power transmission side apparatus and the configuration of the power reception side apparatus in the first embodiment.

In FIG. 2, the charger body 101 is provided with a rectifier circuit 113 which is electrically connected to an alternating current (AC) power supply 103 for home use or for business use, a DC/DC converter 114 which is electrically connected to the rectifier circuit 113, an inverter 115 which is electrically connected to the DC/DC converter 114 and which generates AC power from direct current (DC) power, a control circuit 111 which controls output voltage and frequency or the like of the inverter 115, and a communication circuit 112.

The power reception side apparatus is provided with a rectifier circuit 203 which is electrically connected to the secondary coil 202 and which rectifies electromotive force of the secondary coil 202, a smoothing capacitor 204, a control circuit 211 which controls the rectifier circuit 203 and the battery 201, and a communication circuit 212. The control circuit 211 and the communication circuit 212 use an auxiliary battery (12 V) which supplies electrical power to auxiliaries (not illustrated) of the vehicle 1, as a power supply.

Between the auxiliary battery, and the control circuit 211 and the communication circuit 212, there is provided a power switch 213. If the power switch 213 is OFF, the control circuit 211 and the communication circuit 212 are in the standby state (or low power consumption state). By setting the control circuit 211 and the communication circuit 212 in the standby state, it is possible to suppress power consumption, and also to prevent a reduction in charging amount of the auxiliary battery and exhaustion of the auxiliary battery (so-called battery exhaustion).

Between the smoothing capacitor 204 and the battery 201, there is provided a main relay circuit 206. The main relay circuit 206 is turned off at the end of a charging process of the battery 201.

The communication circuits 112 and 212 are wireless communication circuits such as, for example, wireless LAN and Bluetooth. For example, information associated with charging control, information associated with the battery 201 or the like is bi-directionally transmitted and received between the charger body 101 and the vehicle 1 via the communication circuits 112 and 212.

According to the study of the present inventors, the following matter has been found. The main relay circuit 206 is turned off after the end of the charging process of the battery 201, and thus, a power receiving circuit of the power reception side apparatus has also no load after the end of the charging process. Therefore, if relatively high output power for charging the battery 201 is supplied via the secondary coil 202 at the start of next charging of the battery 201, an excessive load is likely applied to the power reception side apparatus.

In the embodiment, if there is a charging demand of the charger body 101, the control circuit 112 controls the inverter 115 to output small electric power which does not exceed a rated value regarding electricity of components which constitute the power reception side apparatus. On the other hand, in the power reception side apparatus, a start control circuit 205 turns on the power switch 213 in the condition that the small electric power supplied via the secondary coil 202 is detected by the start control circuit 205.

As a result, the control circuit 211 and the communication circuit 212 are restored from the standby state, and the main relay circuit 206 is turned on. The control circuit 211 restored from the standby state transmits information indicating that the control circuit 211 is restored to the start state, to the charger body 101 via the communication circuit 212.

By virtue of such a configuration, it is possible to prevent that the relatively high output power for charging the battery 201 is supplied to the power reception side apparatus even though the power reception side apparatus has no load.

A restoration control process performed in the charging system as configured above will be explained with reference to a flowchart in FIG. 3.

Figure 3:
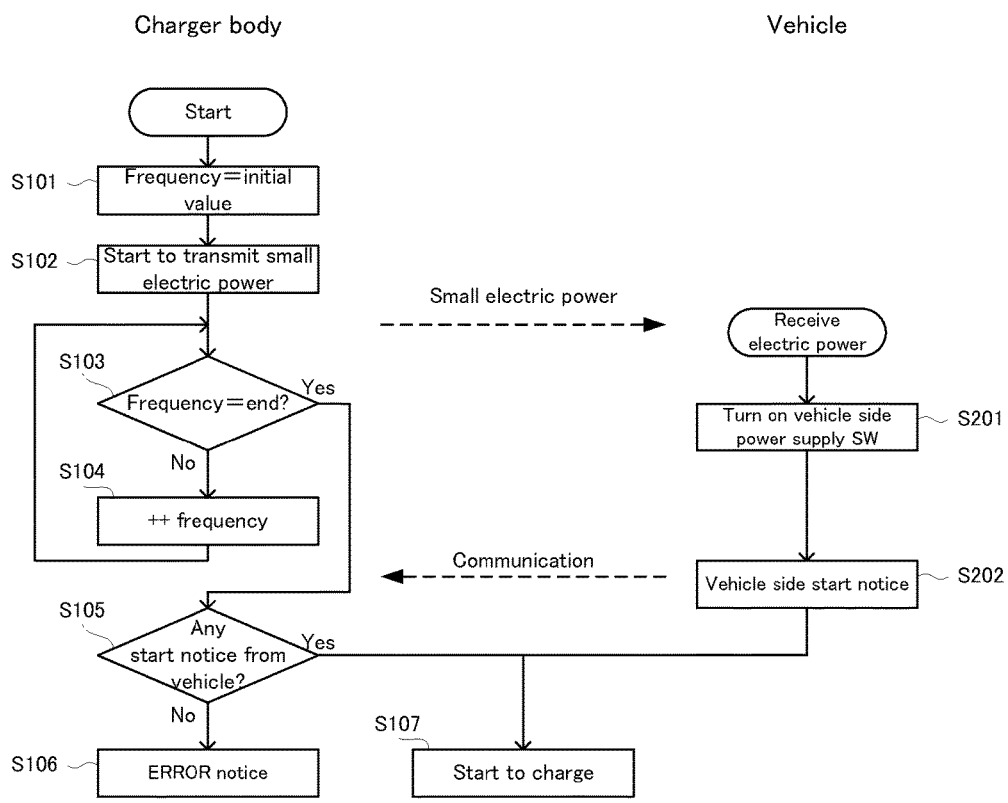
FIG. 3 is a flowchart illustrating a restoration control process in the first embodiment.

In FIG. 3, firstly, the control circuit 111 which detects the charging demand caused by that a switch provided in the charger body 101 is pressed, or by similar actions, controls the inverter 115 such that frequency associated with output power of the inverter has an initial value set in advance (step S101).

Then, the control circuit 111 controls the inverter 115 to output the small electric power (step S102). As a result, the electric power is supplied to the power reception side apparatus (i.e. vehicle 1) via the secondary coil 202.

By the way, if a positional relation between the primary coil 102 and the secondary coil 202 changes due to a parking position or height of the vehicle 1, resonance frequency between the power transmission side apparatus and the power reception side apparatus also changes. If the resonance frequency between the power transmission side apparatus and the power reception side apparatus is different from the frequency associated with the output power of the inverter 115, the electromotive force of the secondary coil 202 is reduced. Then, the supply of the electric power is likely not detected in the power reception side apparatus.

Figure 4:
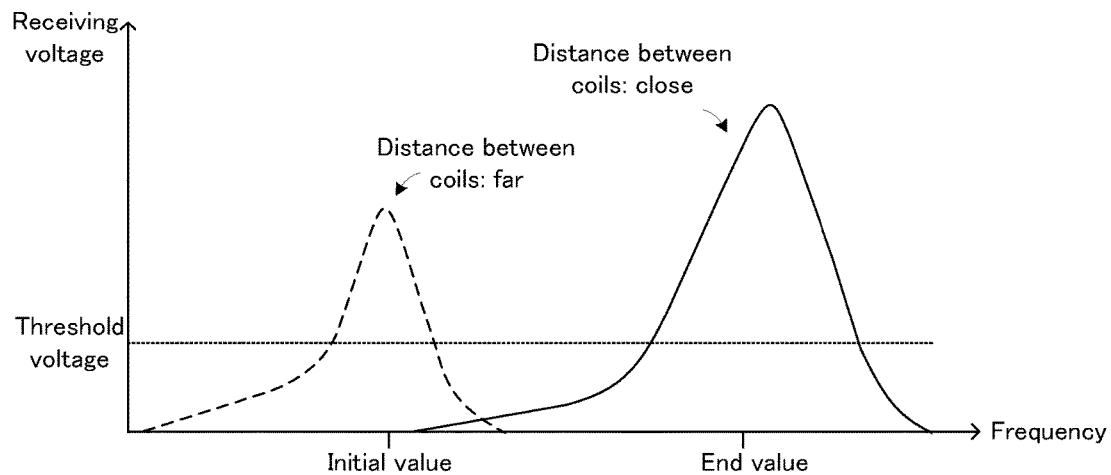
FIG. 4 is a characteristic diagram illustrating one example of a relation between frequency associated with output power of an inverter and receiving voltage, for each distance between a primary coil and a secondary coil.

The control circuit 111 thus controls the inverter 115 to output the small electric power while changing the frequency associated with the output power of the inverter 115. Specifically, for example, as illustrated in FIG. 4, the control circuit 111 controls the inverter 115 to output the small electric power while changing the frequency from the initial value of the frequency set in advance to an end value of the frequency. By this, even if a distance between the primary coil 102 and the secondary coil 202 is relatively close, detectable electric power can be supplied to the power reception side apparatus.

Incidentally, FIG. 4 is a characteristic diagram illustrating one example of a relation between the frequency associated with the output power of the inverter and receiving voltage, for each distance between the primary coil and the secondary coil.

Back in FIG. 3 again, after the process in the step S102, the control circuit 111 determines whether or not the frequency associated with the output power of the inverter 115 has the end value set in advance (step S103). If it is determined that the frequency associated with the output power of the inverter 115 does not have the end value set in advance (the step S103: No), the control circuit 111 controls the inverter 115 to change (or increase here) the frequency associated with the output power of the inverter 115 (step S104).

On the other hand, if it is determined that the frequency associated with the output power of the inverter 115 has the end value set in advance (the step S103: Yes), the control circuit 111 determines whether or not a start notice from the vehicle 1 is received (step S105).

Here, in the vehicle 1 (i.e. the power reception side apparatus), in parallel with the processes in the steps S101 to S104, the start control circuit 205 successively detects voltage of a part after the rectifier circuit 203, and turns on the power switch 213 in the condition that the detected voltage exceeds a predetermined threshold voltage (refer to FIG. 4) (step S201).

As a result, the control circuit 211 in the standby state is restored to the start state. Then, the control circuit 211 restored to the start state transmits the start notice which is the information indicating that the control circuit 211 is restored to the start state, to the charger body 101 via the communication circuit 212 (step S202).

In the charger body 101 (i.e. power transmission side apparatus), if the start notice is not received before the process in the step S105, the control circuit 111 determines that the start notice from the vehicle 1 is not received (the step S105: No), and gives an error notice to a user (step S106).

On the other hand, if the start notice is received before the process in the step S105 in the charger body 101, the control circuit 111 determines that the start notice from the vehicle 1 is received (the step S105: Yes), and starts a predetermined charging process (step S107). At this time, the control circuit 111 controls the inverter 115 to output the relatively high output power for charging the battery 201.

The "primary coil 102", the "secondary coil 202", the "communication apparatus 112", the "communication apparatus 212", the "start control circuit 205" and the "rectifier circuit 203" in the embodiment are one example of the "power transmission unit", the "power reception unit", the "receiving device", the "transmitting device," the "restoring device" and the "rectifier" of the present invention, respectively. The "control circuit 111" in the embodiment is one example of the "obtaining device" and the "controlling device" of the present invention. The "rectifier circuit 113", the "DC/DC converter 114" and the "inverter 115" in the embodiment are one example of the "power transmission circuit" of the present invention. The "rectifier circuit 203", the "smoothing capacitor 204" and the "main relay circuit 206" in the embodiment are one example of the "power receiving circuit" of the present invention. The "control circuit 111" and the "communication circuit 112" in the embodiment are one example of the "first wireless charging control apparatus" of the present invention. The "control circuit 205" and the "communication circuit 212" in the embodiment are one example of the "second wireless charging control apparatus" of the present invention.

<Second Embodiment>

Figure 5:
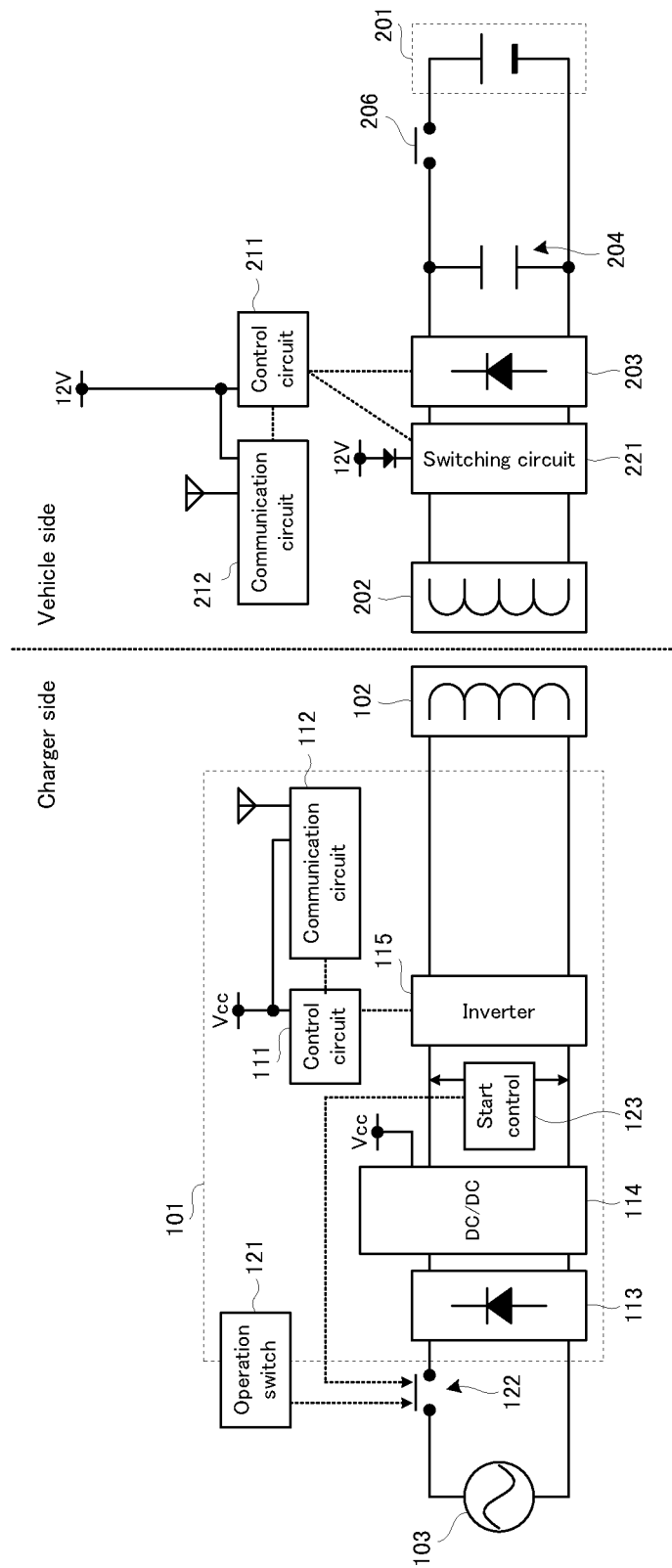
FIG. 5 is a block diagram illustrating a configuration of a power transmission side apparatus and a configuration of a power reception side apparatus in a second embodiment.

Next, a second embodiment of the wireless charging control apparatus of the present invention will be explained with reference to FIG. 5. The second embodiment has the same configuration as that of the first embodiment, except that each of the power transmission side apparatus and the power reception side apparatus has a partially different circuit configuration. Thus, in the second embodiment, a duplicated explanation of the first embodiment will be omitted, and common parts on the drawing will carry the same reference numerals. Basically, only a different point will be explained with reference to FIG. 5. FIG. 5 is a block diagram illustrating a configuration of a power transmission side apparatus and a configuration of a power reception side apparatus in the second embodiment, to the same effect as in FIG. 2.

In FIG. 5, the charger body 101 is provided with an operation switch 121 such as a power button of the charger body 101, a main relay circuit 122 disposed between the AC power supply 103 and the rectifier circuit 113, and a start control circuit 123. The ON/OFF of the main relay circuit 122 is controlled by the operation switch 121 and the start control circuit 123.

Here, in particular, the main relay circuit 122 of the charger body 101 is turned off, for example, after the end of the charging process. As a result, the charger body 101 becomes in the low power consumption state.

On the other hand, on the power reception side apparatus, a switching circuit 221 which is electrically connected, for example, to an auxiliary battery is disposed between the secondary coil 202 and the rectifier circuit 203. In the embodiment, the control circuit 211 in the power reception side apparatus is always electrically connected to the auxiliary battery (i.e. is always in the start state).

If the user of the vehicle 1 desires the charging of the battery 201 mounted on the vehicle 1, the user operates, for example, a predetermined button or the like, thereby transmitting the charging demand to the power reception side apparatus. The control circuit 211 which receives the charging demand controls the switching circuit 221 to output small electric power which does not exceed a rated value regarding electricity of components which constitute the charger body 101.

The start control circuit 123 of the charger body 101 turns on the main relay circuit 122 in the condition that the small electric power supplied via the primary coil 102 is detected. The control circuit 111 of the charger body 101 in which the main relay circuit 122 is turned on performs the predetermined charging process.

By virtue of such a configuration, the user of the vehicle 1 can start the charging of the battery 201 without getting out of the vehicle 1, which is extremely useful in practice.

The present invention is not limited to the aforementioned embodiments, but various changes may be made, if desired, without departing from the essence or spirit of the invention which can be read from the claims and the entire specification. A wireless charging control apparatus, a wireless charging control method and a computer program which involve such changes are also intended to be within the technical scope of the present invention.

DESCRIPTION OF REFERENCE NUMERALS 1 vehicle
101 charger body
102 primary coil
103 alternating current power supply
111, 211 control apparatus
112, 212 communication apparatus
113, 203 rectifier circuit
114 DC/DC converter
115 inverter
121 operation switch
122, 206 main relay circuit
123, 205 start control circuit
201 battery
202 secondary coil
204 smoothing capacitor
221 switching circuit

The invention claimed is:

1. A wireless power transmission apparatus which is configured to transmit charging electric power for charging a battery electrically connected to a power reception side apparatus to the power reception side apparatus by magnetic resonance, and to perform charging of the battery electrically connected to the power reception side apparatus, the wireless power transmission apparatus comprising:
a power transmission unit;
a controlling device configured to control alternating current power, which is supplied to the power transmission unit, to transmit a small electric power, which is lower than the charging electric power, for switching a state of the power reception side apparatus from a standby state, in which the battery can not be charged by the transmitted electric power, to a start state, in which the battery can be charged by the transmitted electric power, from the power transmission unit to a power reception unit of the power reception side apparatus before charging the battery; and
a communication device which configures a communication path, which is different from a power transmission path including the power transmission unit and the power reception unit of the power reception side apparatus, between the power reception side apparatus, and which is configured to perform dual-directional wireless communication through the communication path, wherein, the controlling device controls the alternating current power to output the small electric power while changing frequency of the alternating current power from a first value to a second value, the second value being different from the first value, for making a receiving voltage of the small electric power received via the power reception unit be greater than a threshold value and thereby causing switching the state of the power reception side apparatus from the standby state to the start state, and wherein the controlling device controls the alternating current power to transmit the charging electric power from the power transmission unit to the power reception unit upon information being received through the communication device indicating that the power reception side apparatus is in the start state.

2. A wireless charging system which is configured to transmit charging electric power for charging a battery electrically connected to a power reception side apparatus from a power transmission side apparatus to the power reception side apparatus by magnetic resonance, wherein
the power reception side apparatus comprises:
a power reception unit;
a switching device configured to switch a state of the power reception side apparatus to a standby state, in which the battery can not be charged, or a start state, in which the battery can be charged; and
a power reception side communication device,
the power transmission side apparatus comprises:
a power transmission unit;
a controlling device configured to control alternating current power, which is supplied to the power transmission unit, to transmit a small electric power for switching the state of the power reception side apparatus from the standby state to the start state before charging the battery, the small electric power being lower than the charging electric power; and
a power transmission side communication device,
the power reception side communication device and the power transmission side communication device performs dual-directional wireless communication through a communication path which is different from a power transmission path including the power transmission unit and the power reception unit,
wherein, when the power reception unit receives the small electric power with a receiving voltage of the small electric power that is greater than a threshold value, the switching device switches the state of the power reception side apparatus from the standby state to the start state,
wherein, for making the receiving voltage of the small electric power received via the power reception unit be greater than the threshold value, the controlling device controls a frequency of the alternating current power to output the small electric power initially at a first frequency and then changing the small electric power to a second frequency, the second frequency being different from the first frequency, wherein changing the frequency of the small electric power from the first frequency to the second frequency makes the receiving voltage of the small electric power received via the power reception unit be greater than the threshold value thereby causing switching of the state of the power reception side apparatus from the standby state to the start state, and wherein, the power transmission side communication device receiving information indicating that the power reception side apparatus is in the start state causes the controlling device to control the alternating current power to transmit the charging electric power from the power transmission unit to the power reception unit.

3. The wireless charging system according to claim 2, wherein the small electric power is an amount of electric power which does not exceed a rated value regarding electricity of components which constitute the power reception side apparatus.

4. The wireless charging system according to claim 2, wherein the power reception side communication device is allowed to perform communication with the power transmission side communication device on condition that the power reception unit received the small electric power.

5. The wireless charging system according to claim 4, wherein the power reception side communication device is allowed to perform communication with the power transmission side communication device by supplying power caused by the power reception unit receiving the small electric power.

6. A wireless power transmission method performed by a wireless power transmission apparatus which comprises (i) a power transmission unit, and (ii) a communication device which configures a communication path, which is different from a power transmission path including the power transmission unit and a power reception unit of a power reception side apparatus, between the power reception side apparatus, and which is configured to perform dual-directional wireless communication through the communication path, and which transmits charging electric power for charging a battery electrically connected to the power reception side apparatus to the power reception side apparatus by magnetic resonance, the wireless power transmission method comprising:
a first controlling process for controlling alternating current power, which is supplied to the power transmission unit, to transmit a small electric power, which is lower than the charging electric power, for switching a state of the power reception side apparatus from a standby state, in which the battery can not be charged by the transmitted electric power, to a start state, in which the battery can be charged by the transmitted electric power, from the power transmission unit to the power reception unit before charging the battery; and a second controlling process for controlling the alternating current power to transmit the charging electric power from the power transmission unit to the power reception unit upon receiving information through the communication device indicating that the power reception side apparatus is in the start state, wherein the first controlling process controls the alternating current power to output the small electric power while changing frequency of the alternating current power from a first value to a second value, the second value being different from the first value, for making receiving voltage of the small electric power received via the power reception unit be greater than a threshold value for causing switching the state of the power reception side apparatus from the standby state to the start state.

* * * * *